Figure 1:
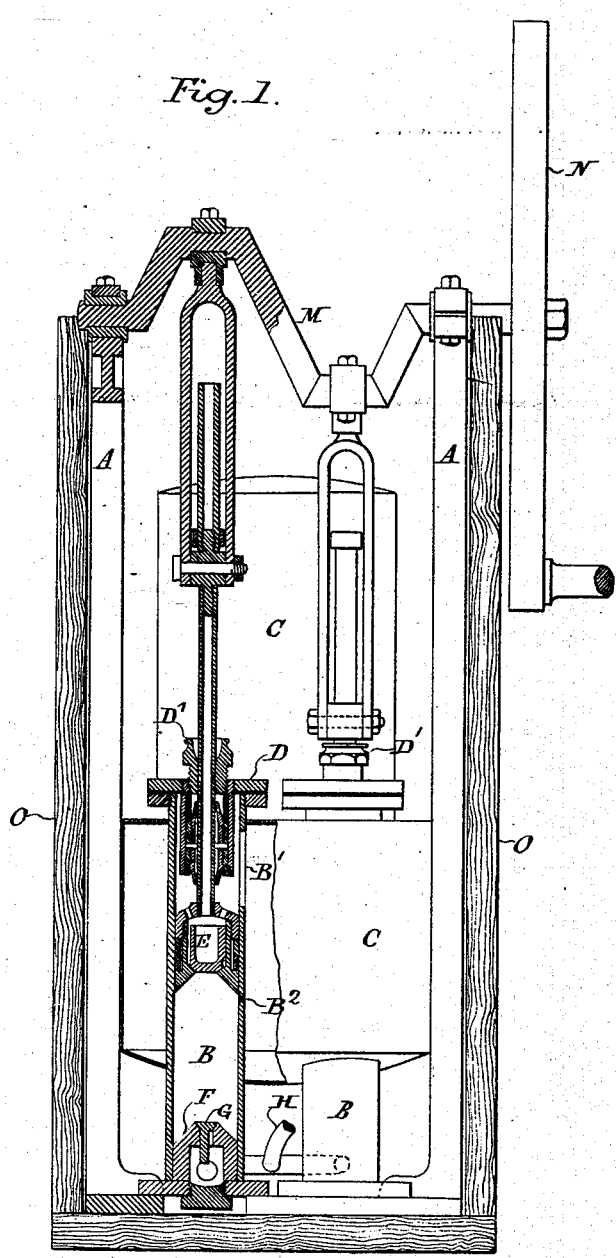

(No Model.)  4 Sheets—Sheet 1.

H. A. FLEUSS.
ICE MACHINE.

No. 326,027. Patented Sept. 8, 1885.

(No Model.) 4 Sheets—Sheet 2.

H. A. FLEUSS.
ICE MACHINE.

No. 326,027. Patented Sept. 8, 1885.

Fig: 2.

(No Model.)

4 Sheets—Sheet 3.

H. A. FLEUSS.
ICE MACHINE.

No. 326,027.

Patented Sept. 8, 1885.

(No Model.) 4 Sheets—Sheet 4.
H. A. FLEUSS.
ICE MACHINE.
No. 326,027. Patented Sept. 8, 1885.
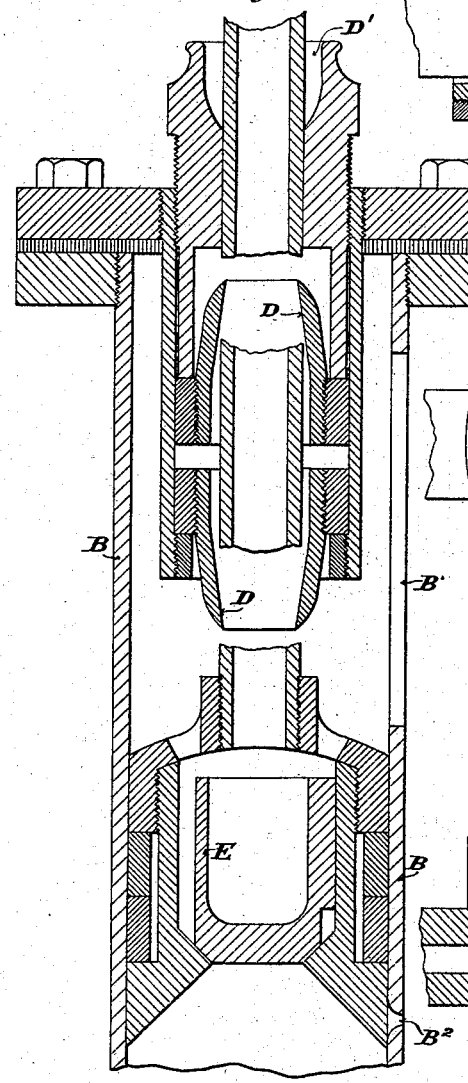
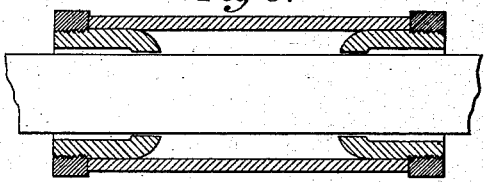
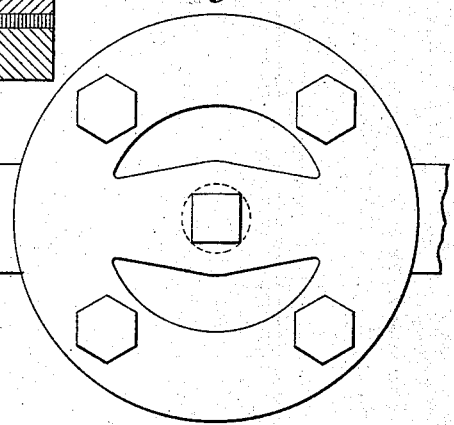
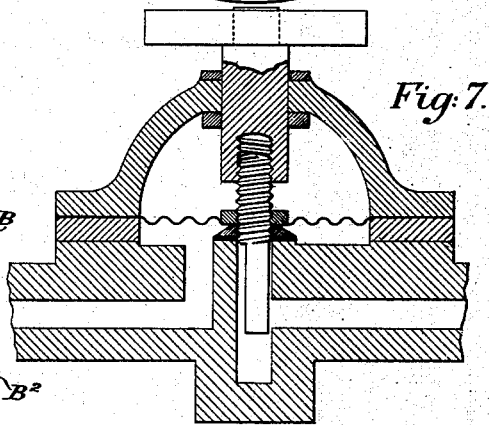
Witnesses.  Inventor.

UNITED STATES PATENT OFFICE.

HENRY ALBERT FLEUSS, OF NEWTOWN, ISLE OF WIGHT, ENGLAND.

ICE-MACHINE.

SPECIFICATION forming part of Letters Patent No. 326,027, dated September 8, 1885.

Application filed December 10, 1884. (No model.) Patented in England February 26, 1884, No. 3,978; in France November 18, 1884, No. 165,443, and in Germany November 25, 1884, No. 31,811.

*To all whom it may concern:*

Be it known that I, HENRY ALBERT FLEUSS, a subject of the Queen of Great Britain, residing at Newtown, Isle of Wight, England, engineer, have invented certain new and useful Improvements in Freezing-Machines, (for which I have obtained Letters Patent No. 3,978, dated February 26, 1884, in Great Britain; No. 165,443, dated November 18, 1884, in France, and No. 31,811, dated November 25, 1884, in Germany,) of which the following is a specification.

This invention has for its object improvements in freezing-machines, and relates to that class of freezing-machines in which a volatile liquid is evaporated in a vacuum.

According to my invention I employ in such machines a light volatile liquid that is insoluble or immiscible in water—such, for example, as amyl-hydride, or rhigolene, or gasoline, the more highly refined the better—and I so arrange the pump that its piston is covered and lubricated with water, (or it might be other liquid not readily vaporizable and not soluble in the readily-vaporizable liquid,) so that only a liquid-tight and not a gas-tight fitting of the piston has to be maintained. The pump-cylinder I place vertically in a closed cistern or tank, in an upper portion or collection-chamber of which the supply of vaporizable liquid is stored. The greater part of the cistern I fill with water. The supply of the light and readily-vaporizable liquid floats on the top of the water. The lower end of the cylinder may be carried through the bottom of the cistern; but the upper part of the cylinder I leave open to the water in the cistern. The piston-rod I carry out through the top of the body or water-containing portion of the cistern through a stuffing-box kept filled with water and fitted with hydraulic collars, one facing upward and the other downward, so that if any leakage takes place into the cylinder it can only be a leakage of water. The piston is made concave on its under side, while the cylinder is made with a convex bottom to fit into the concave under surface of the piston. The vapor-inlet valve is fitted to an opening at the summit of the convex bottom, and the outlet-valve at the summit of the conical piston. An opening is formed through the side of the cylinder, a short distance below the piston when at the top of its stroke, so that at the end of each upward or outward stroke a certain amount of water may pass into the cylinder below the piston and cover the inlet-valve. The passage to the inlet-valve is connected by a pipe with the closed vessel in which evaporation is to be effected, and which is preferably formed, as heretofore, with pockets or recesses into which liquids to be frozen can be placed. The closed vessel in which evaporation is effected is also connected by a pipe with the upper part or collection-chamber of the closed cistern-opening into this chamber a little below the level of the vaporizable liquid contained therein. A stop-valve is placed in this pipe, so that whenever necessary a small quantity of vaporizable liquid can, by opening the valve, be allowed to pass from the collection-chamber of the cistern to the vessel in which evaporation is carried on. This valve I by preference form of a thin metal diaphragm, which by a screw can be allowed to approach or move away from and close an opening in a partition formed across the valve shell or casing.

In the drawings hereunto annexed I have shown various views of a freezing-machine constructed as above described.

Figure 2:
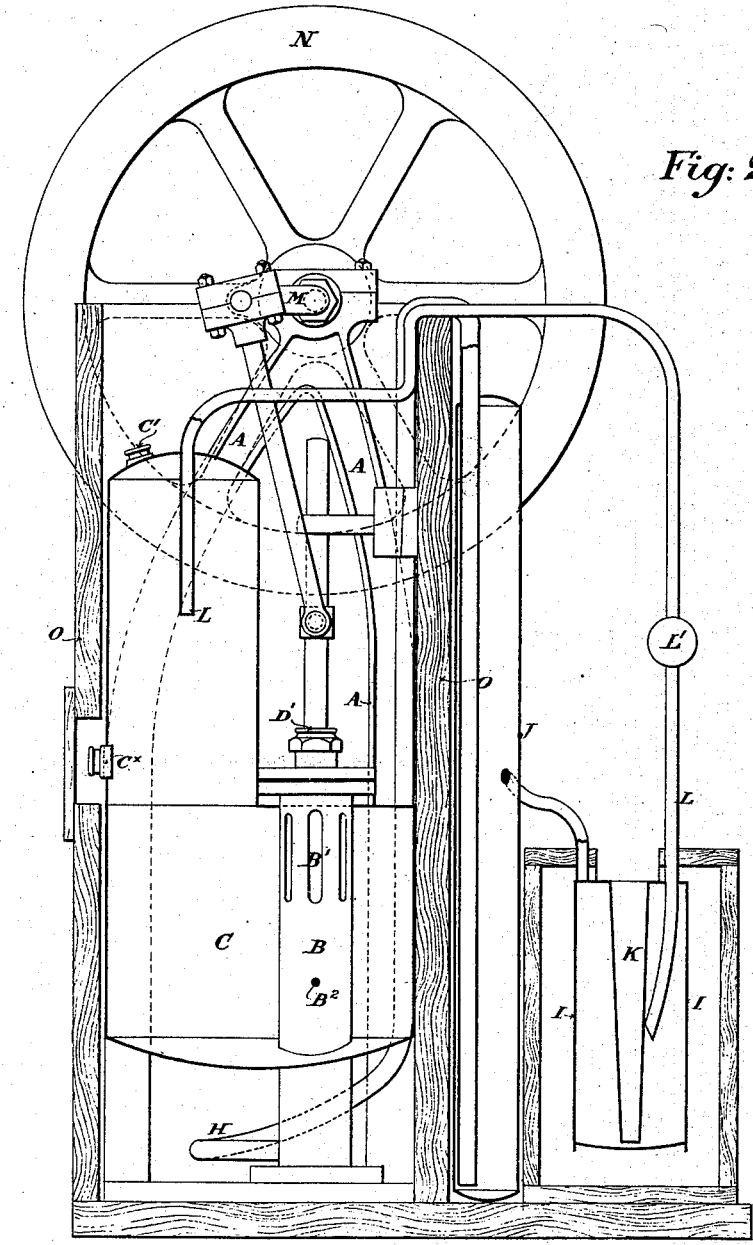

Figure 1 is a side elevation, partly in section. Fig. 2 is a transverse section, and Fig. 3 a plan view of the machine. Fig. 4 is a vertical section, on a larger scale, of the upper part of one of the pump-cylinders. Fig. 5 shows a modified way of forming the stuffing-box through which the piston-rods work. Figs. 6 and 7 show the way in which I prefer to form the valve L'.

In these figures, A is the framing of the machine B B are upright pump-cylinders secured to the bottom of this frame. I prefer to use two pump-cylinders, as shown, so as to render the action of the apparatus approximately uniform.

C is a closed tank or vessel of copper through which the upper part of the cylinders B pass. The tank is at one side carried up considerably above the level of the pump-cylinders, forming a collection-chamber, so that light volatile liquid may collect in the upper part of this upward extension of the tank while the lower part may contain water.

B' B' are openings through the sides of the upper part of the pump-cylinders to allow water to pass into them above the pistons or pump-buckets from the closed tank C.

$B^2$ $B^2$ are other small openings by which water can enter the cylinders below the pistons or pump-buckets when they are at the top of their stroke.

D D are stuffing-boxes through which the piston-rods pass out through the cylinder-covers, which are above the top of the water-containing lower portion of the tank C. Each stuffing-box is, as shown, provided with two cup-packings, one facing upward and the other downward, and made, preferably, of vulcanized fiber, as this material is not acted upon by amyl-hydride, gasoline, or such like volatile liquid.

D' are cups at the top of the stuffing-boxes, which are to be kept filled with water, so that if any leakage takes place into the pump-cylinder it may be a leakage of water and not of air. In Fig. 1 the two cup-leathers are shown to be facing in opposite directions away from one another; but they might, if preferred, be made to face toward one another, as shown at Fig. 5. The packing-rings of the pump-buckets I also by preference form of vulcanized fiber instead of leather.

E is the outlet-valve of each pump-bucket, with its seat at the top of the concave bottom of the bucket.

F is the corresponding convex bottom of the pump-cylinder.

G is the inlet-valve at the summit of this convex bottom.

Figure 3:
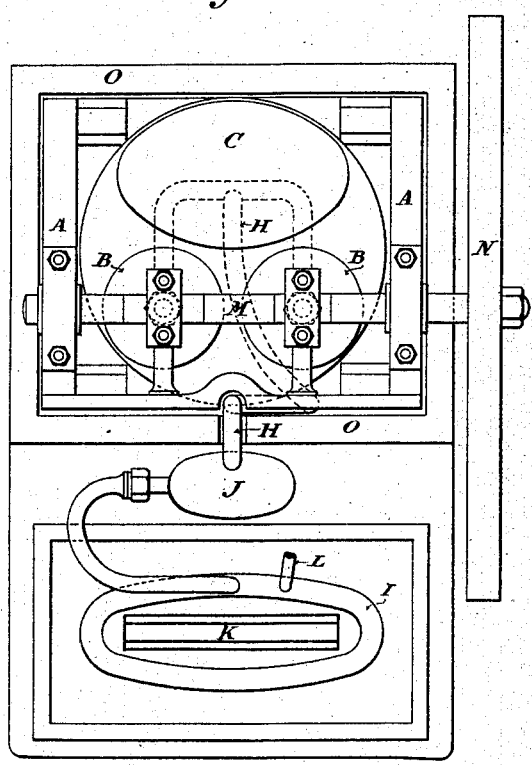

H is the inlet-pipe to the hollow inlet-chamber below the valve G. This pipe, as shown at Figs. 2 and 3, is made to communicate with the upper part of a closed vessel, I, containing the readily-vaporizable liquid. The pipe H has connection with this vaporizing-vessel I in the following way: It is led into a closed vessel, J, and nearly to the bottom of it, while the upper part of the vessel J is put into connection with the upper part of the vaporizing-vessel I by another pipe. The vessel J serves as a vacuum-chamber of large capacity to maintain a comparatively uniform vacuum in the upper part of the vessel I when the pumps are in action, and so insures a steady and continuous boiling of the vaporizable liquid.

In Figs. 2 and 3 the central part of the vessel I is shown to be occupied by a mold, K, in which any liquid required to be frozen is to be placed.

In machines of larger size the vessel I might be immersed in brine or other uncongealable liquid, and the brine be made to circulate by means of a circulating-pump or other arrangement around the exterior of molds or vessels containing the liquids to be frozen. In this case the vessel I might be formed with numerous tubes passing through it or be otherwise formed in such manner as to give a large contact-surface between its exterior and the brine.

L is a small pipe passing from the upper part or collection-chamber of the tank C to the top of the vessel I. It descends into the tank to a level at some distance above the level of the water contained therein.

L' is a stop-valve, by which the passage through the pipe L can be opened or closed at pleasure. The way in which I prefer to form this valve is shown separately at Figs. 6 and 7.

M is a crank-axis, from which motion is given to the piston-rods of the pumps.

N is a fly-wheel fixed thereon and provided with a crank-handle, by which it can be revolved.

O is a wooden box, in which the apparatus is placed. When the apparatus is to be used, it should be filled with water to a level above the top of the pump-cylinders, or a slight stream of water might be arranged to flow through it.

To charge the apparatus the tank C is first filled with water through an opening, C', to a level some distance above the top of the pump-cylinders, but not up to the level of the end of the pipe L. The tank C is provided with an overflow-opening at the water-level. When the tank has been filled with water up to this level, the opening is closed by screwing into it a screw-plug, $C^\times$. When this has been done, the valve L' is closed, and the pump is worked until as good a vacuum is obtained in the vessel I as is practicable. The tank C is then filled up with the readily-vaporizable liquid until there is sufficient liquid above the end of the pipe L to fill or nearly fill the vessel I. The opening C', through which the tank was filled, is then closed by a screw-plug and the valve L' is opened. The liquid which is above the end of the pipe L then at once passes along the pipe L and into the vessel I, and the apparatus is ready to be used. When the mold or molds K have been filled with liquid to be frozen and the pump is worked, each pump-cylinder will, during each upward or outward stroke of its piston, have vapor drawn into it from the vessel I, and even if the piston did not fit the cylinder tightly nothing but water could leak past it. At the end of each up-stroke, when the piston passes above the small opening $B^2$, a small quantity of water enters the lower part of the cylinder and covers over the top of the inlet-valve G. Any leakage backward past the valve must then be a leakage of water and not of vapor. During the downward stroke of the piston the vapor is compressed or condenses, and when the bottom of the piston descends onto the water at the bottom of the cylinder the condensed vapor becomes inclosed in the hollow in the bottom of the piston, and when sufficiently condensed lifts the valve E, and as the piston completes its descent passes through the open top of the pump-bucket or piston into the upper part of the cylinder and floats upward from the top of the cylinder to above the surface of the water in the closed tank C. The water at the bottom of the cylinder also passes upward through the valve after the whole of the condensed vapor has escaped past it. In this way any small amount of liquid left below the piston at the bottom of the stroke must of necessity be water and not the readily-vaporizable liquid. This enables me readily to obtain a better vacuum than is ordinarily obtained in freezing-machines of this class. This advantage can also be obtained if other means than those just described are adopted for causing a small amount of water to be injected into the cylinders at the completion of each upstroke; but those described are well adapted for the purpose.

Other means might also be adopted for cooling the tank C and the pump-cylinders.

After the apparatus has been used for some time and a large portion of the readily-vaporizable liquid has been withdrawn from the vessel I and discharged into the collection-chamber of the closed tank C, it is only necessary to again open the cock L' to allow the vaporizable liquid which has collected in the closed tank C to pass back again into the vessel I. The working of the apparatus can then again be continued at any time.

In the case of large machines which are to be kept at work for a considerable time, it will be better to keep the valve L' partly open, so that there is a continuous supply of vaporizable liquid in the vessel I, the opening of the valve L' to be regulated by the height of the vacuum-gage upon the vaporizing-vessel I.

I have found amyl-hydride to be particularly suited for the purposes of this invention. This liquid can be used over and over again in the machine with most satisfactory results.

Having now particularly described and ascertained the nature of my said invention, and in what manner the same is to be performed, I declare that what I claim is—

1. The combination of the upright pump cylinder or cylinders, the piston for each cylinder, the cylinder-tank containing liquid (such as water) communicating with the interior of the upper part of each cylinder, the inlet-valve at the bottom of each cylinder, the outlet-valve of each piston, the vaporizing-vessel, the collection-chamber or upper portion of the cylinder-tank containing a light volatile liquid (such as amyl-hydride) insoluble in the liquid of the cylinder-tank, and the pipe by way of which the collection-chamber and vaporizing-vessel communicate, these members being and operating substantially as set forth.

2. The combination of the cylinder-tank, the vertical pump-cylinder having an opening near its upper end by which it communicates with the liquid contained in the cylinder-tank, a coned projection at the bottom of the pump-cylinder, the inlet-valve, the pump-piston made concave on its under side to correspond with the coned projection, the outlet-valve at the top of this concavity, the vaporizing-vessel, the pipe leading from the top of the cylinder-tank to the vaporizing-vessel, and a pipe leading from this vessel and communicating with the inlet-valve, substantially as and for the purpose set forth.

3. The combination, in a freezing-machine, of the cylinder-tank, the vertical pump-cylinder having the coned projection at its bottom, the piston having its under side formed with a concavity corresponding with said coned projection, the inlet and outlet valves of the cylinder and piston, respectively, and means for injecting liquid into the cylinder at the end of each outward stroke of the piston, substantially as and for the purpose set forth.

HENRY ALBERT FLEUSS.

Witnesses:
 HERBERT E. DALES,
 JNO. DEAN,
Both of 17 Gracechurch Street, London, E. C.